Oct. 20, 1953
H. V. HITES
2,655,701
MOLDING CORE AND REUSABLE KNOCKDOWN ARBOR THEREFOR
Filed Sept. 4, 1951
3 Sheets-Sheet 1
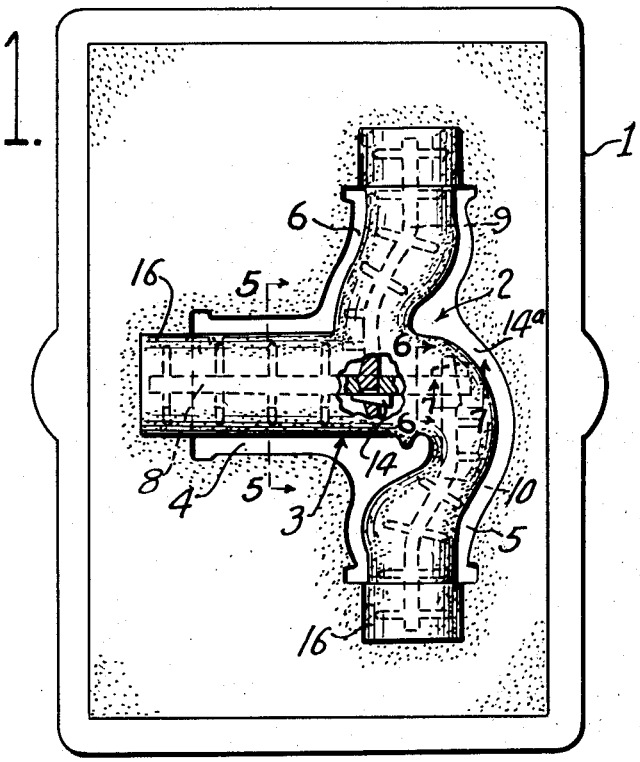
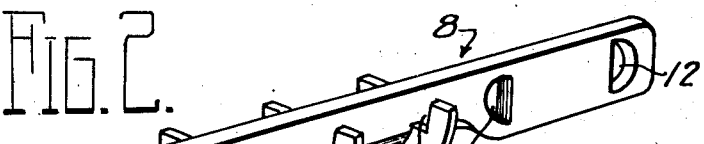
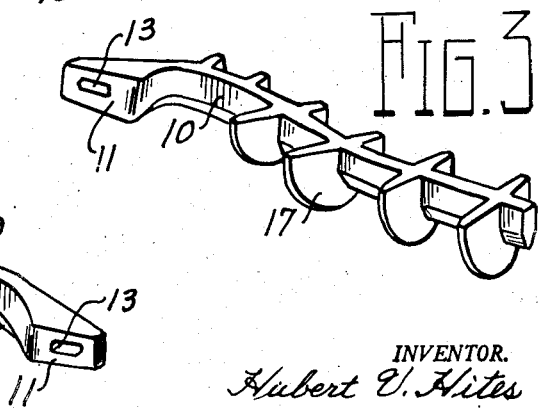
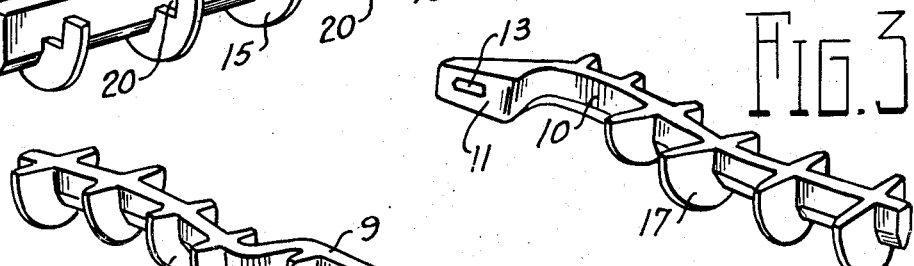
INVENTOR.
Hubert V. Hites
BY
Owen & Owen
ATTORNEYS

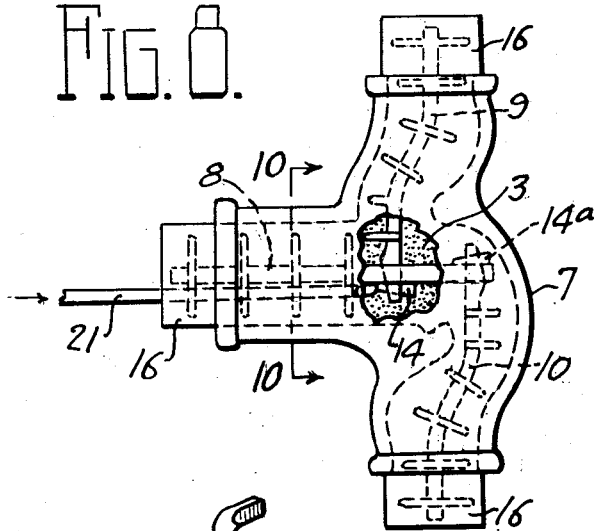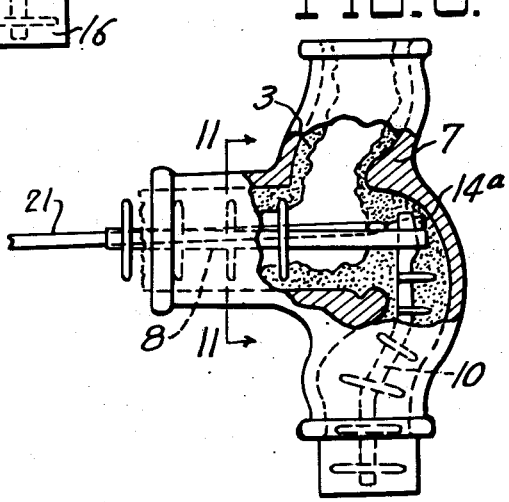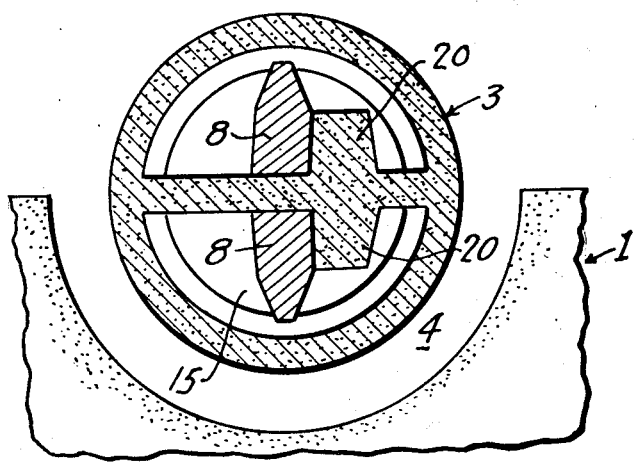

Oct. 20, 1953 H. V. HITES 2,655,701
MOLDING CORE AND REUSABLE KNOCKDOWN ARBOR THEREFOR
Filed Sept. 4, 1951 3 Sheets—Sheet 3
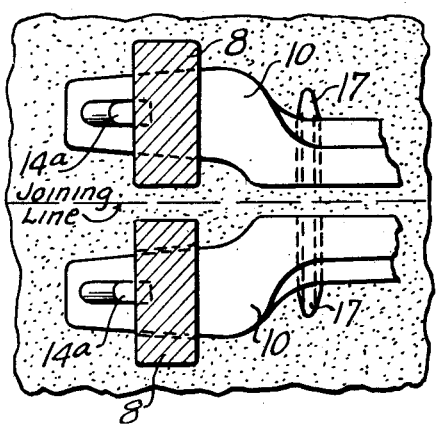
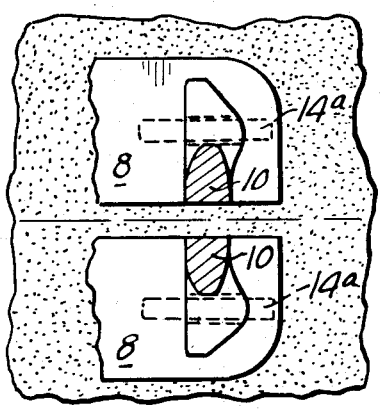
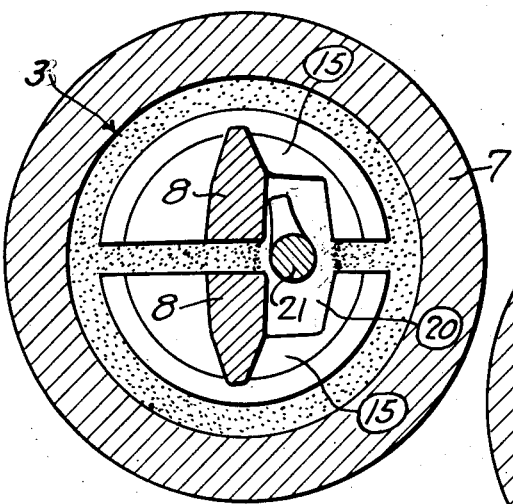
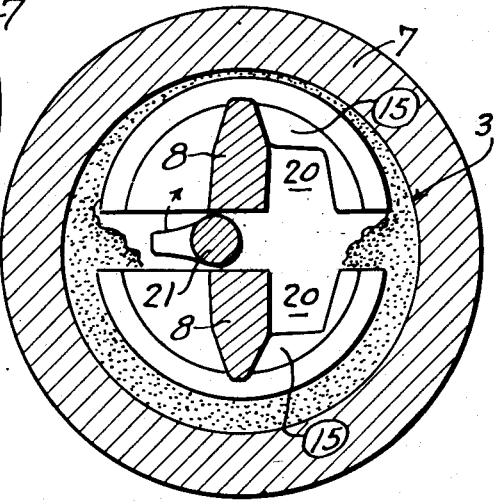
INVENTOR.
Hubert V. Hites
BY Owen & Owen
ATTORNEYS Patented Oct. 20, 1953

2,655,701

UNITED STATES PATENT OFFICE 2,655,701

MOLDING CORE AND REUSABLE KNOCK-DOWN ARBOR THEREFOR

Hubert V. Hites, Springfield, Ohio, assignor to The Ohio Steel Foundry Company, Lima, Ohio, a corporation of Ohio Application September 4, 1951, Serial No. 244,933

7 Claims. (Cl. 22—172)

This invention relates to foundry apparatus, and particularly to reinforcing arbors for the sand cores of molds used in casting hollow angular articles, for instance as non-return and globe valves.

In the molding of angular articles, such as described, and particularly those of large dimensions, it has been customary to use metal rods in the construction of the sand cores, which rods are bent in various shapes to suit the particular core, and usually comprise a single integral member having various arms or parts reinforcing different angular portions of the core. In removing the core from a casting, it is necessary to first loosen and remove some of the core sand from the casting openings so as to permit access to the core rods and to then reach into the passage openings with a suitable tool and cut the rods into various pieces to permit their removal. This operation is objectionable, among other reasons, as it occasions considerable labor, time and expense in removing the cores, and it destroys the rods so they cannot be used again for similar core work, thus requiring the making of new core rods for repeat orders or for the making of like successive castings.

The primary object of the invention is to simplify and lessen the time, expense and labor incident to the making of castings of the character described including the elimination of many operations heretofore considered necessary.

A further object of the invention is the provision of a multiple part arbor having interconnecting separable parts that may be connected together in the making of a core and form a rigid body arbor with various branches, and which is capable of having the connections of its parts or branches easily released from outside the casting and without mutilation of the arbor parts.

Another object of the invention is the provision in molds of the class described of a core arbor of a nature to rigidly support a core in a mold in a manner to prevent sagging in the drag or raising in the cope, and which eliminates the use of chaplets, the provision of holes therefor in the casting, the subsequent closing of such holes and the possibility of leaks through the casting wall which frequently occurs with the use of steel chaplets.

A further advantage of the invention is the provision of a core reinforcement that permits the efficient use of green sand in the core construction, resulting in the many advantages in molding incident thereto, including elimination of stress, easy core collapsibility, reduction in shakeout time, elimination of veining and blows common to dry baked cores, and permits a casting to take normal shrinkage while solidifying. Also, due to the use of green sand combined with the heavy steel arbor, the core cleans out more rapidly leaving a smooth casting surface free from scabs and veining that are common to dry sand cores.

Another advantage is that dimensional tolerances can be held more closely due to the elimination of core stresses.

The invention is fully described in the following specification, and a preferred embodiment thereof illustrated in the accompanying drawings, in which:

Fig. 1 is a top plan view of the drag section of a mold with a core embodying the invention mounted therein and having a part broken away; Figs. 2, 3 and 4 are perspective views of the different members of the core arbor in which the invention particularly resides; Fig. 5 is an enlarged section on the line 5—5 in Fig. 1; Figs. 6 and 7 are enlarged fragmentary sections on the lines 6—6 and 7—7 in Fig. 1; Fig. 8 is a plan of a casting removed from its mold with a part broken away and with a core embodying the invention shown therein, and with an arbor lock-releasing tool shown inserted into the core to effect release of the lock for one of the arbor branches; Fig. 9 is a similar view of a casting showing a tool inserted to release the other arbor-branch lock than that shown as being released in Fig. 8; Figs. 10 and 11 are enlarged cross-sections taken, respectively, on the line 10—10 in Fig. 8 and on the line 11—11 in Fig. 9, and Fig. 12 is a perspective view of a suitable lock-release tool.

Referring to the drawings, 1 designates the drag section of a mold in the cavity 2 of which is mounted the core 3 in which a reinforcing arbor embodying the invention is imbedded and which core is preferably of green sand. The mold cavity 2 is of angular form, and in the present instance comprises three separate portions designated 4, 5 and 6, such as are commonly present in globe and non-return valves the casting of which is designated 7. In these valves the side or branch passages 5 and 6 usually connect with the main passage 4 in spaced relation axially of the latter as indicated, and the reinforcing means for each longitudinally divided half of the core heretofore consisted of metal rods bent and welded or otherwise rigidly connected to conform to the irregular T-form of the core. When shaking out the casting core with such reinforcement, it is necessary to reach into the casting passages with suitable tools and cut the core rods into several pieces to permit their removal in sections from the respective passages. This takes time and labor, thereby adding to the casting expense. It also destroys the core reinforcement so that it is incapable of repeat use without rebuilding and the rewelding together of its separate parts for each casting operation, thus adding materially to the casting cost.

To obviate these objections and others, the core reinforcement for each upper and lower half or section of the core, which sections are customarily made separately and pasted together, comprises a metal arbor having a plurality of separable sections capable of being connected together in a manner to permit easy and rapid disconnection by the use of a tool or tools insertable into a casting through the core sand, preferably in one only of the casting passages.

This core reinforcement, which is usually the same for each upper and lower section of the core, comprises a body or main arbor section 8 and the two branch sections 9 and 10, the section 8 usually being straight to conform to the neck passage and the sections 9 and 10 being curved or bent to project laterally from the main section and conform substantially to the axial lines of the respective branch passages of the mold cavity section in which disposed.

Each branch section 9, 10 has a tapered inner stud end 11 adapted to have a wedge fit into a respective hole 12 in the body bar of the main section 8 and to project beyond the opposite side thereof. Said projected end of each section is provided at said opposite side of the main arbor bar with a keyhole 13 for receiving a respective tapered locking key 14, 14ᵃ that is inserted from the side of the stud that faces the inner end of the neck passage 4 of the mold cavity 2. Each key can then be forced out of its arbor stud hole by a tool inserted into the neck passage of a casting through a sand core therein, as will be hereinafter more fully described.

Each arbor section is of rigid bar-form with the bar of the body section 8 straight or substantially so and formed outwardly from the inner hole 12 with a series of transverse semicircular webs 15 that are spaced lengthwise of the bar and have their outer marginal edges in slightly inwardly spaced relation to the periphery of the portion of the core in which disposed, as indicated in Fig. 5. The other end of each core arm or projection is formed with the customary print portion 16 that seats in the sand body of the respective flask members and serves to support the core in desired spaced relation to the wall of the mold cavity, and the outer end of each arbor section projects into its print, as shown.

Each branch arbor sections 9 and 10, which is usually other than straight, is provided with transverse webs 17 similar to the webs 15, except that some of the inner webs 17 are disposed at one side only of the respective arbor bar to allow for the particular shape of the respective branch passage of a casting and to permit easy removal of an arbor section therefrom when disconnected from the main section 8. The webs 15 of the straight section 8 are notched at the side of the bar at which the inner key 14 is disposed, as shown at 20, for the insertion into the core of a suitable key-releasing tool 21 (Figs. 8, 9, 10, 11 and 12), as hereinafter more fully described.

In practice, the core 3 is made into upper and lower half round sections in the usual manner, with an arbor reinforcement imbedded in each section and the two sections are then placed one on the other and secured together to form a core the branches of which, in the case of a valve casting, are substantially round in cross-section, as shown.

The completed core is then mounted in the cavity 2 of the mold drag section 1, being supported therein by mounting the core prints 16 in the mold sand at the ends of the cavity branches, as is customary. When the casting has been molded and removed from the flask with the core 3 therein, the core sand, at least at the neck end of the casting, is shaken out as much as the arbor reinforcement will permit, and a suitable bar-like tool 21 is then inserted lengthwise through the neck sand of the core in the passage formed by the notches 20 of the arbor flanges 15 and forced against the registering small end of the key 14 to effect its release from the arbor bar 9, thus permitting such bar to be withdrawn from within the portion 6 of the casting without mutilation of the arbor. This permits a further loosening of the core sand sufficient to enable the two laterally spaced arbor bars 8, 8 of the neck portion of the core to be forced apart by pressure applied to the outer ends thereof. A key-removal tool 21 similar to that shown in Fig. 12 is then inserted lengthwise into the space between the two bars, and the hooked end of the tool used at a side thereof to engage and force the key 14ᵃ from the slot 13 in the arbor bar 10, as illustrated in Figs. 9 and 11. It is thus apparent that the arbor bars may be easily and quickly disconnected within a casting, separately removed therefrom without mutilation or distortion, and repeatedly used for making other like or similar castings.

The use of the present core reinforcement, among other advantages, eliminates rods in the construction of cores and the time and expense incident to the use of new rods and the welding together of the same for original and repeat orders, permits core to be made with green sand, which in itself is a considerable saver in labor and expense in core building and use, eliminates the necessity of using chaplets with their accompanying disadvantages, and tends to produce better castings than is possible with the core reinforcements heretofore used.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. A reusable reinforcement for angular shake-out cores for the angular through passages of castings, comprising a main arbor section for one portion of the core, a branch arbor for another portion of the core, a releasable tongue-and-slot connection between said sections holding one in rigid angular relation to the other, and a knockout key in said branch section extending lengthwise of the main section and preventing release of the interengaging sections, said key being removable by a knockout tool applied lengthwise of the main section, and means on the main arbor section for guiding the knockout tool.

2. A combination as called for in claim 1, wherein the main arbor section at least has a plurality of lateral flanges spaced lengthwise of the section, with the flanges of the main arbor section provided with openings which align lengthwise of the main section and permit insertion of a tool lengthwise through a core at a side of such section to apply a releasing force to the key.

3. A reusable reinforcement for angular shakeout cores for the angular passages of castings, comprising a main arbor section for one portion of the core, at least two branch arbor sections for other portions of the core extending laterally from the main section and having tongue-and-slot connections at their inner ends with the main section, a knockout key associated with each of said connections to hold the sections assembled, said keys being successively releasable by knockout forces applied lengthwise of said main arbor section by a tool inserted alongside thereof, and means on the main section for guiding the tool.

4. A combination as called for in claim 3, wherein said arbor sections have lateral flanges spaced lengthwise thereof, said flanges on the main section having openings therethrough aligned lengthwise of the section through which a tool may be inserted to successively apply a releasing knockout force to each of said keys.

5. A reusable reinforcing arbor for the shakeout core of a casting having a main passage with an angularly disposed branch passage therefrom, comprising a main arbor section having two companion parts adapted to be placed lengthwise side-by-side in the main passage, each of said parts having a plurality of substantially half round flanges spaced lengthwise of the parts and each flange having a recess adjacent to its carrying part and in register with a like recess of a flange of the companion part to cooperate to form openings lengthwise of said parts through which a knockout tool may be inserted, a side arbor section including two companion parts each having releasable engagement at its inner end with a registering one of said main section parts, knockout keys holding said side arbor parts in releasable engagement with said main arbor parts with said keys extending lengthwise of said main arbor parts and releasable by the longitudinal thrust of a tool inserted through said flange openings lengthwise of the main arbor section.

6. A combination as called for in claim 5, wherein more than one of said side arbor sections is employed in separate branch passages of the core and is releasably engaged with the registering main arbor section parts in spaced relation lengthwise of the main section parts to said first side arbor section parts, together with a knockout key for each of said section parts, all of said keys being releasable by longitudinal thrust of a tool inserted through said flange openings.

7. A reusable reinforcing arbor for the cores of non-return and globe type valves, comprising a bar-like section for the main portion of the core, a similar branch section for each of the branch sections of the core, said branch sections each having releasable tongue-and-slot connection at their inner ends to the main section, a releasable key for locking each branch section to the main section in spaced relation lengthwise thereof, said main arbor sections having lateral flanges spaced lengthwise thereof, said flanges having openings therethrough aligned lengthwise of the section through which a tool may be inserted to successively apply a releasing force to each of said keys.

HUBERT V. HITES.

References Cited in the file of this patent
UNITED STATES PATENTS

| Number | Name | Date |
|---|---|---|
| 489,188 | Smith | Jan. 3, 1893 |
| 860,510 | Yates | July 16, 1907 |
| 1,073,010 | Wright | Sept. 10, 1913 |